(12) United States Patent
Nagayasu et al.

(10) Patent No.: US 8,668,889 B2
(45) Date of Patent: Mar. 11, 2014

(54) AIR POLLUTION CONTROL SYSTEM AND METHOD

(75) Inventors: Tatsuto Nagayasu, Tokyo (JP); Takashi Kamijo, Tokyo (JP); Masayuki Inui, Tokyo (JP); Tsuyoshi Oishi, Tokyo (JP); Hiromitsu Nagayasu, Tokyo (JP); Hiroshi Tanaka, Tokyo (JP); Takuya Hirata, Tokyo (JP); Tatsuya Tsujiuchi, Tokyo (JP); Susumu Okino, Tokyo (JP); Naoyuki Kamiyama, Tokyo (JP); Seiji Yoshihara, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/700,878

(22) PCT Filed: May 31, 2011

(86) PCT No.: PCT/JP2011/062869
§ 371 (c)(1),
(2), (4) Date: Jan. 24, 2013

(87) PCT Pub. No.: WO2011/152549
PCT Pub. Date: Dec. 18, 2011

(65) Prior Publication Data
US 2013/0136680 A1 May 30, 2013

(30) Foreign Application Priority Data
May 31, 2010 (JP) ................................. 2010-125387

(51) Int. Cl.
*B01D 53/34* (2006.01)
*B01D 53/50* (2006.01)
*B01D 53/56* (2006.01)
*B01D 53/74* (2006.01)
*B01D 53/75* (2006.01)
*B01D 46/00* (2006.01)
*B01D 53/62* (2006.01)

(52) U.S. Cl.
USPC ................... 423/210; 423/215.5; 423/243.01; 423/220; 423/239.1; 422/168; 422/169; 422/170; 422/172; 422/177; 422/187

(58) Field of Classification Search
USPC .............. 423/210, 215.5, 243.01, 220, 239.1; 422/168, 169, 170, 172, 177, 187
See application file for complete search history.

(56) References Cited

U.S. PATENT DOCUMENTS 7,601,317 B2    10/2009   Orita et al.
8,025,860 B1 *   9/2011   Diamond ....................... 423/210

(Continued)

FOREIGN PATENT DOCUMENTS

DE      41 33 581 A1 *   4/1993  ............ B01D 53/02
JP      54-086879 A     7/1979

(Continued)

OTHER PUBLICATIONS
International Search Report of PCT/JP2011/062869, mailing date Jul. 12, 2011.

(Continued)

*Primary Examiner* — Timothy Vanoy
(74) *Attorney, Agent, or Firm* — Westerman, Hattori, Daniels & Adrian, LLP

(57) ABSTRACT

$SO_x$ removal equipment for reducing sulfur oxides from flue gas from a boiler, a cooler which is provided on the downstream side of the $SO_x$ removal equipment, for reducing the sulfur oxides from the flue gas and for decreasing a gas temperature, $CO_2$ recovery equipment which includes an absorber for bringing $CO_2$ in the flue gas into contact with a $CO_2$ absorption liquid so as to be reduced and a regenerator for causing the $CO_2$ absorption liquid to emit $CO_2$ so as to recover $CO_2$ and regenerate the $CO_2$ absorption liquid, and dissolved salt spraying equipment for reducing a mist generation material which is a generation source of mist that is generated in the absorber of the $CO_2$ recovery equipment before introducing the flue gas to the $CO_2$ recovery equipment, are included.

5 Claims, 5 Drawing Sheets
(1 of 5 Drawing Sheet(s) Filed in Color)

(56) References Cited

U.S. PATENT DOCUMENTS

| | | |
|---|---|---|
| 8,302,388 B2 | 11/2012 | Kobayashi et al. |
| 2006/0239881 A1 | 10/2006 | Nagayasu et al. |
| 2010/0119428 A1 | 5/2010 | Nagayasu et al. |
| 2011/0076216 A1 | 3/2011 | Orita et al. |
| 2013/0136679 A1* | 5/2013 | Nagayasu et al. ............ 423/220 |
| 2013/0142715 A1* | 6/2013 | Nagayasu et al. ............ 423/220 |

FOREIGN PATENT DOCUMENTS

| | | |
|---|---|---|
| JP | 03-193116 A | 8/1991 |
| JP | 05-245339 A | 9/1993 |
| JP | 7-241440 A | 9/1995 |
| JP | 10-305210 A | 11/1998 |
| JP | 2001-347186 A | 12/2001 |
| JP | 2005-087828 A | 4/2005 |
| JP | 2006-326575 A | 12/2006 |
| WO | 2008/078722 A1 | 7/2008 |

OTHER PUBLICATIONS

Written Opinion of PCT/JP2011/062869, mailing date Jul. 12, 2011.
Written Opinion of PCT/JP2011/062868, mailing date of Aug. 2, 2011.
International Search Report for PCT/JP2011/062868, mailing date of Aug. 2, 2011.
English Translation of Written Opinion of PCT/JP2011/062868, mailing date of Aug. 2, 2011.
International Search Report for PCT/JP2011/062871, mailing date of Jul. 12, 2011.
Written Opinion for PCT/JP2011/062871 mailing date Jul. 12, 2011.
US Office Action dated Jul. 29, 2013, issued in related U.S. Appl. No. 13/700,924.

* cited by examiner

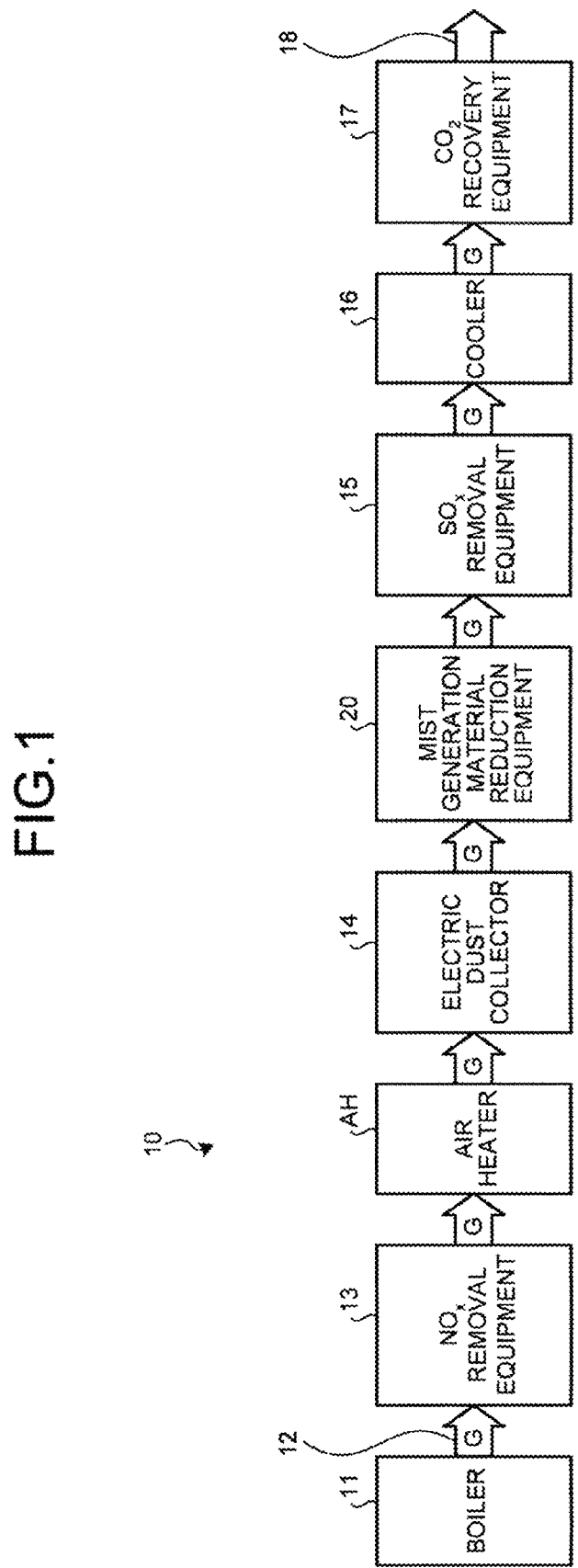

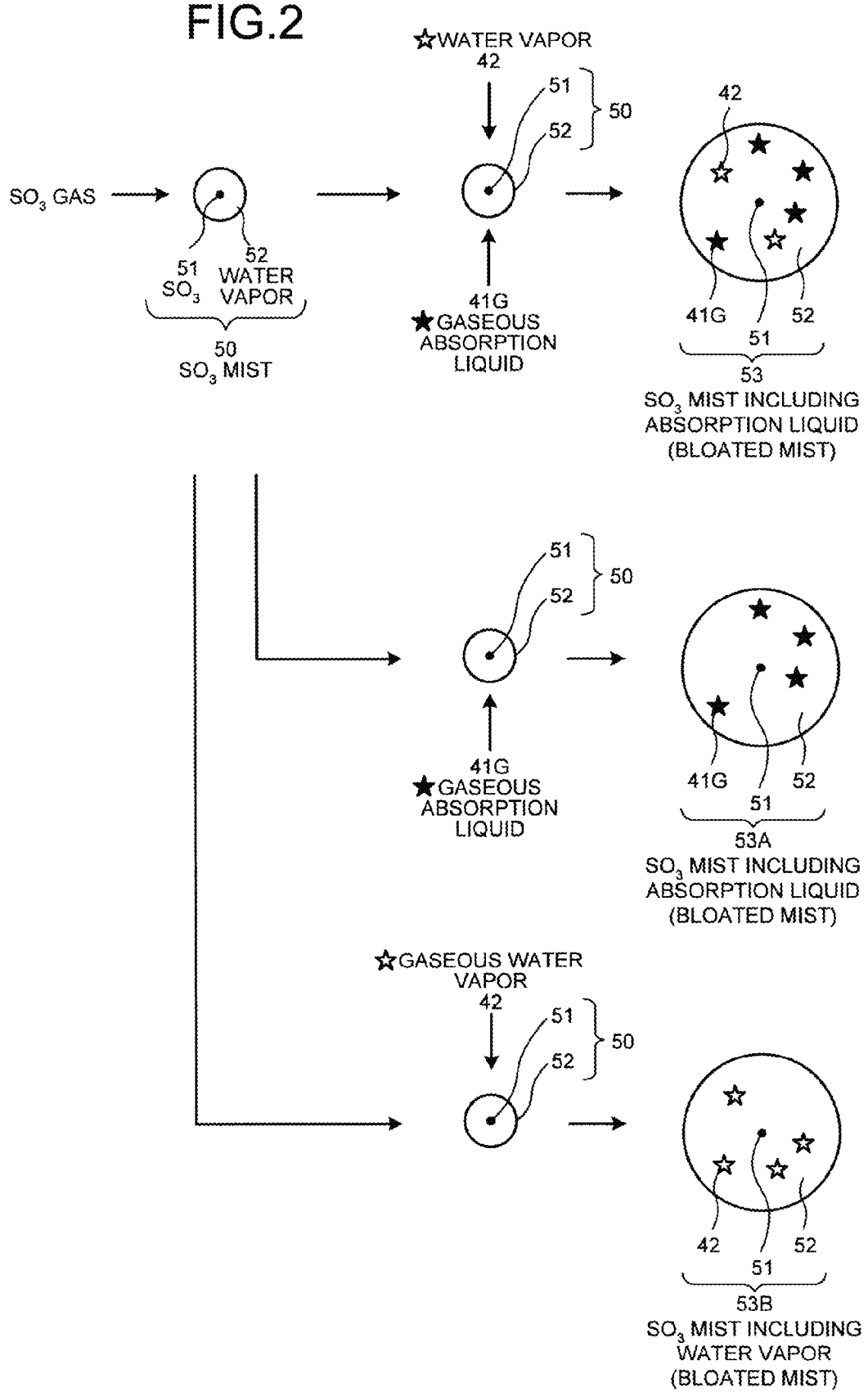

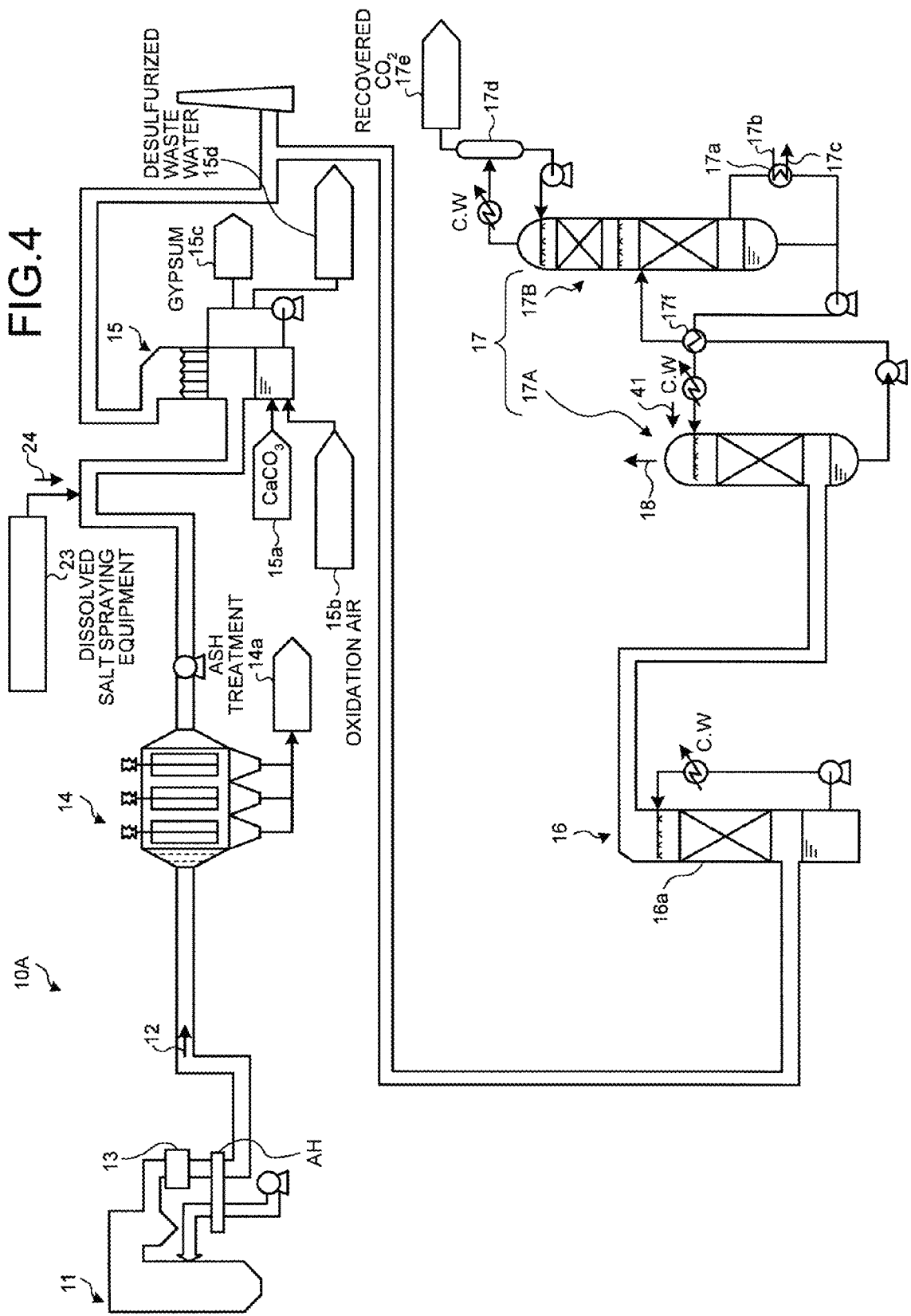

AIR POLLUTION CONTROL SYSTEM AND METHOD

FIELD

The present invention relates to an air pollution control system and method that reduce $CO_2$ from flue gas.

BACKGROUND

In recent years, the greenhouse effect due to $CO_2$ is indicated as one of causes of the global warming phenomenon, and the countermeasures thereof become an internationally urgent matter to protect the global environment. $CO_2$ generation sources reach all human activity fields in which fossil fuels are burned, and there is a tendency to further strengthen the demand for suppression of the discharge thereof. For this, for a power generation facility such as a thermal power plant that uses a large amount of fossil fuels, a method of bringing combustion flue gas of an industrial facility such as a boiler or a gas turbine into contact with an amine-based $CO_2$ absorption liquid to reduce and recover $CO_2$ from the combustion flue gas and an air pollution control system which stores the recovered $CO_2$ without emission to air has been energetically researched.

$CO_2$ recovery equipment which has, as the process of reducing and recovering $CO_2$ from the combustion flue gas using a $CO_2$ absorption liquid as described above, a process of bringing the combustion flue gas into contact with the $CO_2$ absorption liquid in a $CO_2$ absorber (hereinafter, also simply referred to as "absorber"), and a process of heating the $CO_2$ absorption liquid that absorbs $CO_2$ in an absorption liquid regenerator (hereinafter, also simply referred to as "regenerator") to emit $CO_2$ and regenerate the $CO_2$ absorption liquid so as to be circulated through the $CO_2$ absorber to be reused, is proposed (for example, Patent Literature 1).

In the $CO_2$ absorber, through countercurrent contact using an amine-based $CO_2$ absorption liquid such as alkanolamine, $CO_2$ in the flue gas is absorbed by the $CO_2$ absorption liquid in a chemical reaction (exothermic reaction), and the flue gas from which $CO_2$ is reduced is emitted to the outside of the system. The $CO_2$ absorption liquid that absorbs $CO_2$ is also called a "rich solution". The rich solution is pressurized by a pump, is heated in a heat exchanger by a high-temperature $CO_2$ absorption liquid (lean solution) regenerated as $CO_2$ is emitted in the regenerator, and is supplied to the regenerator.

CITATION LIST

Patent Literature

Patent Literature 1: Japanese Laid-open Patent Publication No. 3-193116

SUMMARY

Technical Problem

However, in the air pollution control system, in a case where a mist generation material that is a generation source of mist generated in the absorber of the $CO_2$ recovery equipment is included in the flue gas introduced to the $CO_2$ absorber that absorbs $CO_2$ in the $CO_2$ recovery equipment, there is a problem in that the $CO_2$ absorption liquid is entrained by the mist generation material and thus the amount of $CO_2$ absorption liquid that scatters to the outside of the system is increased.

Such a case, where the scattering of the $CO_2$ absorption liquid to the outside of the system occurs, is connected to a significant loss of the $CO_2$ absorption liquid reused in the regenerator, and an unnecessary amount of the $CO_2$ absorption liquid has to be replenished. Therefore, the scattering of the $CO_2$ absorption liquid to the outside of the system needs to be suppressed.

Here, the establishment of an air pollution control system which suppresses the scattering of a $CO_2$ absorption liquid from a $CO_2$ absorber is desired.

In order to solve the problem, an object of the present invention is to provide an air pollution control system and method capable of significantly reducing entraining of a $CO_2$ absorption liquid when flue gas from which $CO_2$ is reduced is discharged to the outside of a system, and performing an appropriate air pollution control.

Solution to Problem

According to a first aspect of invention in order to solve the above problems, there is provided an air pollution control system including: an electric dust collector which reduces particulates from flue gas from a boiler; $SO_x$ removal equipment which reduces sulfur oxides from the flue gas after the reduction in the particulates; a cooler which is provided on a downstream side of the $SO_x$ removal equipment so as to reduce the sulfur oxides that remain in the flue gas and decrease a gas temperature; $CO_2$ recovery equipment which includes an absorber for bringing $CO_2$ in the flue gas into contact with a $CO_2$ absorption liquid so as to be reduced, and a regenerator for causing the $CO_2$ absorption liquid to emit $CO_2$ so as to recover $CO_2$ and regenerate the $CO_2$ absorption liquid; and dissolved salt spraying equipment which reduces a mist generation material which is a generation source of mist that is generated in the absorber of the $CO_2$ recovery equipment before introducing the flue gas to the $CO_2$ recovery equipment.

According to a second aspect of the present invention, there is provided the air pollution control system according to the first aspect, further including $NO_x$ removal equipment which reduces nitrogen oxides from the flue gas.

According to a third aspect of the present invention, there is provided an air pollution control system including: $SO_x$ removal equipment which reduces sulfur oxides from flue gas from a boiler; a cooler which is provided on a downstream side of the $SO_x$ removal equipment so as to reduce the sulfur oxides that remain in the flue gas and decrease a gas temperature; $CO_2$ recovery equipment which includes an absorber for bringing $CO_2$ in the flue gas into contact with a $CO_2$ absorption liquid so as to be reduced, and a regenerator for causing the $CO_2$ absorption liquid to emit $CO_2$ so as to recover $CO_2$ and regenerate the $CO_2$ absorption liquid; and dissolved salt spraying equipment which reduces a mist generation material which is a generation source of mist that is generated in the absorber of the $CO_2$ recovery equipment before introducing the flue gas to the $CO_2$ recovery equipment.

According to a fourth aspect of the present invention, there is provided the air pollution control system according to the third aspect, further including: $NO_x$ removal equipment which reduces nitrogen oxides from the flue gas; and a dry type electric dust collector which reduces particulates.

According to a fifth aspect of the present invention, there is provided an air pollution control method including: on an upstream side of $CO_2$ recovery equipment which brings $CO_2$ in flue gas into contact with a $CO_2$ absorption liquid so as to be absorbed and reduced, on a downstream side where particulates are reduced from the flue gas and on an upstream side of $SO_x$ removal equipment which reduces sulfur oxides, spraying a dissolved salt into the flue gas to cause a mist generation material to be adsorbed and fixed onto the dissolved salt so as to be reduced; and decreasing an amount of the mist generation material in the flue gas introduced to the $CO_2$ recovery equipment to a predetermined amount or less.

Advantageous Effects of Invention

According to the air pollution control system of the present invention, since the dissolved salt spraying equipment is provided as the mist generation material reduction equipment before the introduction to the $CO_2$ recovery equipment, the amount of mist generation material in the flue gas when being introduced to the $CO_2$ absorber is significantly decreased. As a result, the amount of $CO_2$ absorption liquid that is entrained by mist and scatters to the outside of the system is decreased. Therefore, the loss of the $CO_2$ absorption liquid that scatters to the outside of the system may be significantly decreased, and an increase in running cost during the air pollution control may be suppressed.

BRIEF DESCRIPTION OF DRAWINGS

The patent or application file contains at least one drawing executed in color. Copies of this patent or patent application publication with color drawing(s) will be provided by the Office upon request and payment of necessary fee.

FIG. 1 is a schematic diagram of an air pollution control system of an embodiment according to the present invention.

FIG. 2 is a conceptual diagram of a mechanism of mist generation.

FIG. 3-1 is a photograph illustrating a state where white smoke is decreased in a $CO_2$ absorber.

FIG. 3-2 is a photograph illustrating a state where white smoke is generated in the $CO_2$ absorber.

FIG. 4 is a schematic diagram of the air pollution control system according to a first embodiment.

DESCRIPTION OF EMBODIMENTS

Hereinafter, the present invention will be described in detail with reference to the drawings. Note that, the present invention is not limited by embodiments and examples. In addition, components in the embodiments and the examples include those that may be easily assumed by those skilled in the art or are practically the same.

Figures 1, 3:
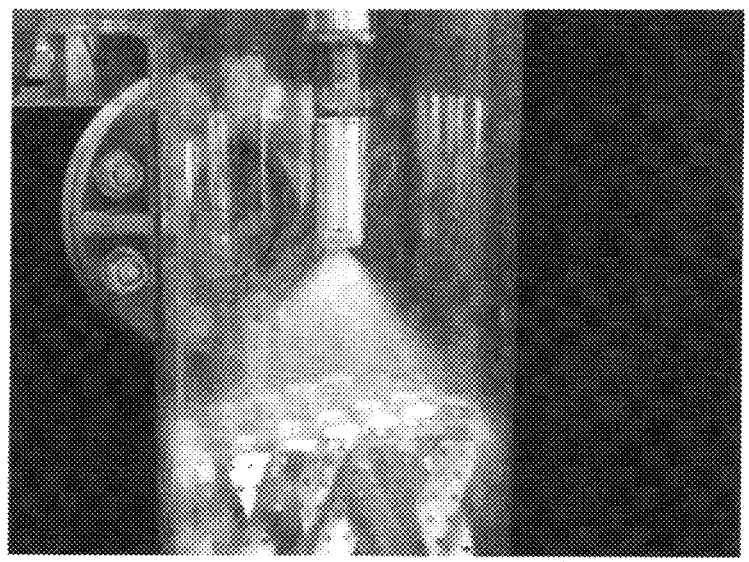

FIG. 1 is a schematic diagram of an air pollution control system of an embodiment according to the present invention.

As illustrated in FIG. 1, in an air pollution control system 10 of the embodiment according to the present invention, flue gas 12 from a boiler 11 is subjected to a reduction in nitrogen oxides ($NO_x$) from the flue gas 12 by $NO_x$ removal equipment 13, and thereafter is first guided to an air heater AH to heat air supplied to the boiler 11. Thereafter, the flue gas 12 is introduced to a dry type electric dust collector 14 which is dust reduction equipment so as to reduce particulates. Next, the flue gas 12 is introduced to $SO_x$ removal equipment 15 to reduce sulfur oxides ($SO_x$). Then, the flue gas 12 is cooled by a cooler 16, is thereafter introduced to $CO_2$ recovery equipment 17 to reduce carbon dioxide, and purified gas 18 is emitted from the top portion of a $CO_2$ absorber to the air which is outside the system. Note that, the particulates reduced by the electric dust collector 14 are subjected to an additional ash treatment 14a.

In the present invention, before introducing the flue gas 12 to the $CO_2$ recovery equipment 17, mist generation material reduction equipment 20 which reduces a mist generation material that is a generation source of mist generated in the $CO_2$ absorber of the $CO_2$ recovery equipment 17 is provided.

According to the air pollution control system according to the present invention, since the mist generation material reduction equipment 20 is provided before the introduction to the $CO_2$ recovery equipment 17, the amount of mist generation material in the flue gas 12 when being introduced to the $CO_2$ absorber of the $CO_2$ recovery equipment 17 is significantly decreased. As a result, the amount of $CO_2$ absorption liquid (hereinafter, also referred to as "absorption liquid") entrained by mist and discharged to the outside may be significantly decreased. As a result, the loss of the absorption liquid that scatters to the outside of the system is significantly decreased, and thus an unnecessary replenishment is eliminated, thereby suppressing an increase in running cost during the air pollution control.

The mist generation material reduced by the mist generation material reduction equipment 20 according to the present invention is $SO_3$ mist, nitric acid mist, hydrochloric acid mist, water vapor mist, or the like and is referred to as a material that becomes a mist generation factor in the $CO_2$ absorber. Note that, equipment that performs a reduction in a gas state before becoming mist is also included in the mist generation material reduction equipment 20 according to the present invention.

Since the flue gas 12 from the boiler 11 is in a high-temperature state, the mist generation material is present in a gas state at first. Thereafter, in a process of passing through the electric dust collector and the $SO_x$ removal equipment, the flue gas is cooled, and thus the mist generation material changes from the gas state to a mist state.

The particle size of the mist of the mist generation material in the present invention is referred to as a size of equal to or smaller than 3.0 μm.

The form of mist generation and entraining of the absorption liquid in the $CO_2$ absorber of the $CO_2$ recovery equipment 17 will be described using FIGS. 2, 3-1, and 3-2.

Figures 2, 3:
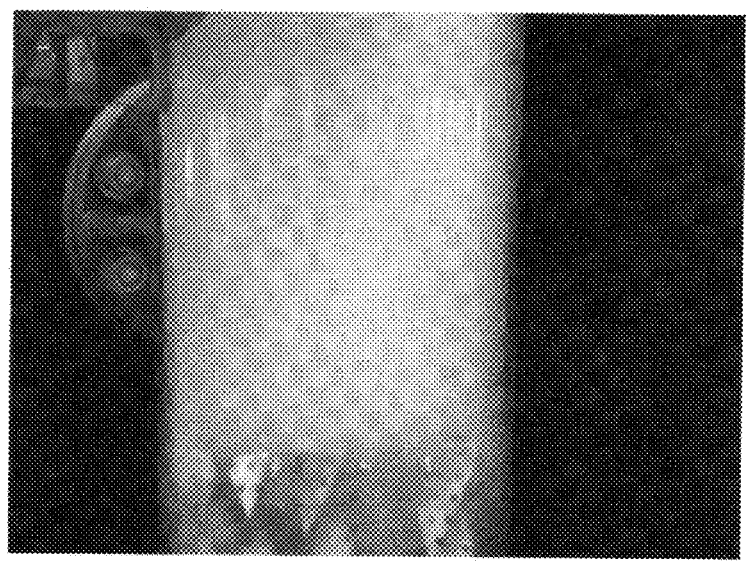

FIG. 2 is a conceptual diagram of a mechanism of entraining of the absorption liquid by mist generation. FIG. 3-1 is a photograph illustrating a state where white smoke is decreased in the $CO_2$ absorber, and FIG. 3-2 is a photograph illustrating a state where white smoke is generated in the $CO_2$ absorber. Although, $SO_3$ mist is exemplified as the mist generation material in the description, descriptions with other kinds of mist will be the same. The flue gas 12 from the boiler 11 is subjected to a gas purifying treatment such as $NO_x$ removal, a reduction in particulates, and $SO_x$ removal, and the flue gas 12 is cooled by the cooler 16, resulting in a gas temperature of about 50° C. Since this temperature state is equal to or less than the acid dew point, there is $SO_3$ mist (for example, 0.1 to 1.0 μm).

A $SO_3$ mist 50 has $SO_3$ as a nucleus 51 and water vapor 52 that is present in the periphery thereof such as clouds.

In the $CO_2$ absorber, the absorption liquid is sprayed from nozzles and falls, and the falling absorption liquid and the flue gas are subjected to countercurrent contact such that $CO_2$ is absorbed by the absorption liquid. On the other hand, the flue gas 12 is introduced from the lower side of the $CO_2$ absorber and is discharged to the upper side. Here, the $SO_3$ mist 50 is not absorbed by the absorption liquid and ascends along with the gas stream of the flue gas 12.

Here, in the $CO_2$ absorber, when the absorption liquid is supplied from the nozzles, the absorption liquid falls and a part of the absorption liquid and moisture evaporates, and thus a gaseous absorption liquid 41G and water vapor 42 are generated.

In addition, the amount of gaseous absorption liquid 41G and the water vapor 42 further increases as the temperature of the absorption liquid is increased due to, for example, the exothermic reaction of the absorption liquid when $CO_2$ is absorbed.

Then, the gaseous absorption liquid 41G and the water vapor 42 are incorporated into the $SO_3$ mist 50, resulting in a $SO_3$ mist (bloated mist) 53 including a bloated (for example, about 0.5 to 2.0 μm) absorption liquid.

As described above, the $SO_3$ mist 50 in the flue gas 12, before being introduced to the $CO_2$ recovery equipment 17, incorporates the gaseous absorption liquid 41G and the water vapor 42 in the $CO_2$ absorber, becomes the $SO_3$ mist 53 including the absorption liquid, and scatters from the top portion of the $CO_2$ absorber while being entrained by the flue gas 12. Therefore, the loss of the absorption liquid occurs.

The form of white smoke generation in the $CO_2$ absorber is illustrated in FIGS. 3-1 and 3-2.

FIG. 3-1 illustrates a case where the amount of mist generation material is decreased to a predetermined amount or less by providing the mist generation material reduction equipment 20 for the flue gas 12 introduced to the $CO_2$ absorber and a state where the scatting of the $SO_3$ mist (bloated mist) 53 including the absorption liquid in the $CO_2$ absorber is significantly reduced and thus generation of white smoke is suppressed. FIG. 3-2 illustrates a case where the flue gas 12 is introduced as it is without providing the mist generation material reduction equipment 20 for the flue gas 12 introduced to the $CO_2$ absorber and a state where the scatting of the $SO_3$ mist (bloated mist) 53 including the absorption liquid in the $CO_2$ absorber occurs and thus white smoke is generated.

That is, in the present invention, the mist generated in the $CO_2$ absorber is referred to as the $SO_3$ mist (bloated mist) 53 including the absorption liquid. Confirming the presence or absence of the generation of bloated mist is referred to as the presence or absence of generation of white smoke, and by suppressing the bloated mist in the $CO_2$ absorber, generation of white smoke is eliminated. Furthermore, the scattering of the absorption liquid is prevented.

In addition, regarding the bloated mist, as illustrated in FIG. 2, there may be cases where the gaseous absorption liquid 41G and the gaseous water vapor 42 are separately incorporated into the $SO_3$ mist 50 in the flue gas 12 in the $CO_2$ absorber to respectively form a $SO_3$ mist (bloated mist) 53A including the absorption liquid and a $SO_3$ mist (bloated mist) 53B including the water vapor.

Here, in the case of the mist (bloated mist) 53B including the water vapor, there is no loss of the absorption liquid. However, since generation of white smoke of the purified gas 18 to be discharged to the outside of a system occurs, a reduction in the mist generation material is also needed.

Therefore, according to the present invention, by providing the mist generation material reduction equipment 20 before introduction to the $CO_2$ recovery equipment 17, entraining of the $CO_2$ absorption liquid may be significantly reduced when the flue gas 12 from which $CO_2$ is reduced is discharged to the outside of the system, and an appropriate air pollution control may be performed.

Therefore, in the present invention, by providing the mist generation material reduction equipment 20 that reduces the mist generation material which is the generation source of the mist (the $SO_3$ mist including the absorption liquid which is the bloated mist) generated in the $CO_2$ absorber of the $CO_2$ recovery equipment 17 before introducing the flue gas 12 to the $CO_2$ recovery equipment 17, the loss of the absorption liquid that scatters to the outside of the system from the $CO_2$ absorber may be significantly decreased.

The mist generation material reduction equipment 20 may be provided on the upstream side of the dry type electric dust collector 14, between the dry type electric dust collector 14 and the $SO_x$ removal equipment 15, or in either of the front and the rear of the cooler 16, or to be integrated into the cooler 16.

Here, before introducing the flue gas 12 to the $CO_2$ recovery equipment 17, it is preferable that the amount of $SO_3$ mist 50 be decreased to 3 ppm or less for prevention of white smoke and prevention of scattering of the absorption liquid in the $CO_2$ absorber. This is because when the amount of $SO_3$ mist 50 is decreased to 3 ppm or less, scattering is suppressed, and deterioration of, for example, an amine-based absorption liquid due to $SO_3$ is prevented.

According to the present invention, since the scattering of the absorption liquid is prevented and the deterioration of the absorption liquid is prevented, a decrease in the number of regeneration treatments performed in the regeneration equipment (reclaiming equipment) for the absorption liquid may be achieved, and the loss of the absorption liquid is further significantly decreased, so that a decrease in the amount of the replenished absorption liquid may be achieved. Therefore, the system efficiency of the air pollution control system may be significantly enhanced.

Note that, in this embodiment, the electric dust collector is exemplified as the dust reduction equipment in the description. However, the present invention is not limited to this as long as particulates are reduced from the flue gas 12, and besides the electric dust collector, for example, a bag filter or a venturi scrubber may be exemplified.

In the following embodiment, a specific form of the mist generation material reduction equipment that reduces the mist generation material will be described.

First Embodiment

Figure 5:
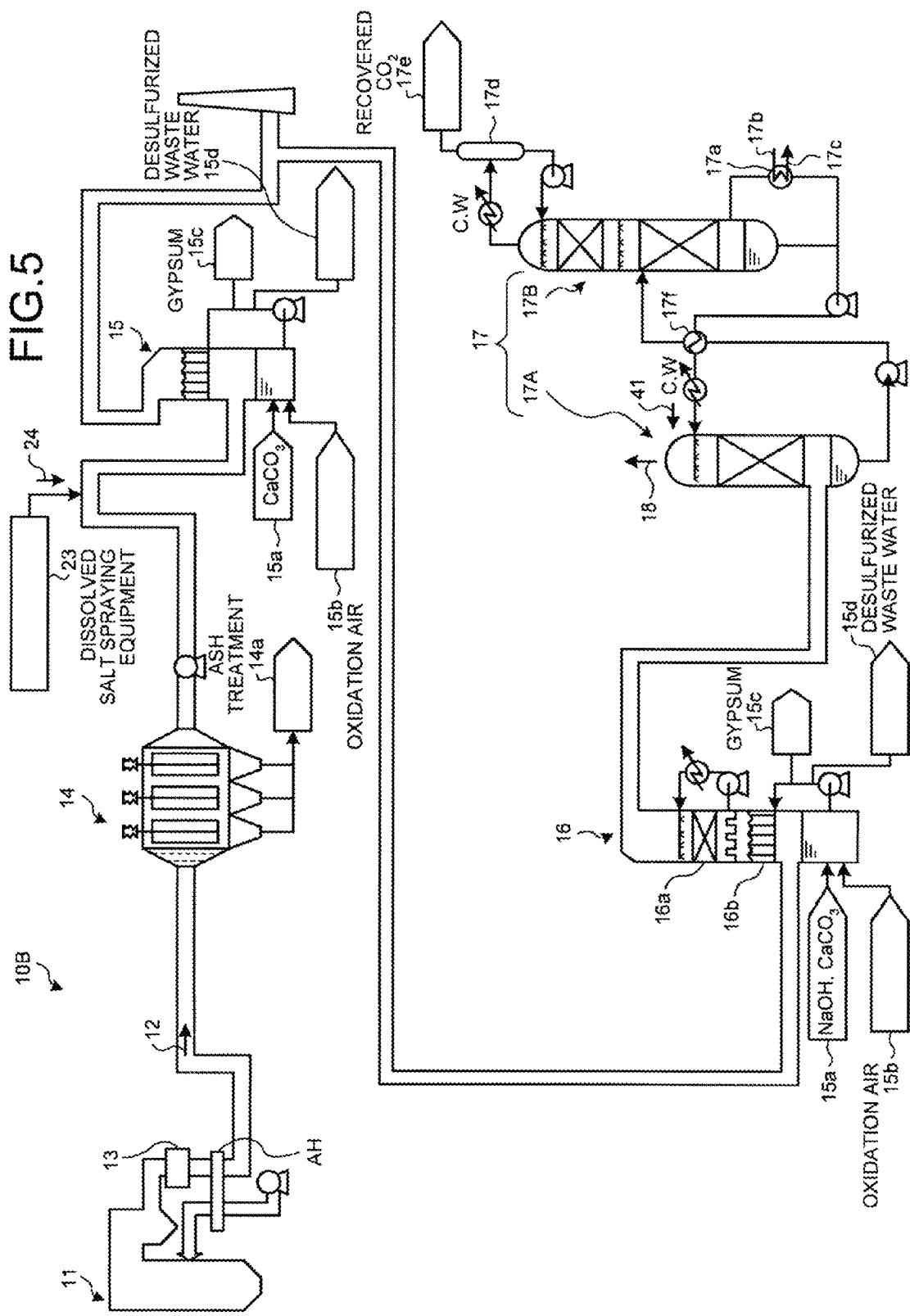
FIG. 5 is a schematic diagram of another air pollution control system according to the first embodiment.

The air pollution control system including the $CO_2$ recovery equipment according to an embodiment of the present invention will be described with reference to the drawings. FIG. 4 is a schematic diagram of the air pollution control system according to the first embodiment. FIG. 5 is a schematic diagram of another air pollution control system according to the first embodiment. Note that, in the following embodiment, $SO_3$ is exemplified as the mist generation material in the description, but the present invention is not limited thereto.

As illustrated in FIG. 4, an air pollution control system 10A according to the first embodiment includes the $NO_x$ removal equipment 13 which reduces nitrogen oxides from the flue gas 12 from the boiler (for example, coal-fired boiler) 11, the dry type electric dust collector 14 which is provided on the downstream side of the $NO_x$ removal equipment 13 and reduces particulates from the flue gas 12, the $SO_x$ removal equipment 15 which is provided on the downstream side of the electric dust collector 14 and reduces sulfur oxides from the flue gas 12, the cooler 16 which is provided on the downstream side of the $SO_x$ removal equipment 15 and has a cooling unit 16a that decreases the gas temperature, and the $CO_2$ recovery equipment 17 which includes an absorber 17A that brings $CO_2$ in the flue gas 12 into contact with the absorption liquid so as to be reduced and a regenerator 17B that causes the absorption liquid to emit $CO_2$ to recover the $CO_2$ and regenerate the absorption liquid.

In this embodiment, before introducing the $SO_3$ mist to the $CO_2$ recovery equipment 17, as a countermeasure to reduce the mist generation material, dissolved salt spraying equipment 23 is provided between the electric dust collector 14 and the $SO_x$ removal equipment 15 to spray a dissolved salt 24 into the flue gas 12. The dissolved salt spraying equipment 23 according to this embodiment functions as the mist generation material reduction equipment 20 illustrated in FIG. 1.

As a result, an aqueous solution of the dissolved salt 24, which is soluble, such as $Na_2SO_4$ and $MgSO_4$ is sprayed on the upstream side of the $SO_x$ removal equipment 15. As the dissolved salt solution is sprayed into the flue gas 12 having a gas temperature of about 130° C. to 150° C. on the downstream side of the dry type electric dust collector 14, fine dry dissolved salt particles are formed, and $SO_3$ in the gas state is adsorbed and fixed onto the dissolved salt particles, thereby reducing the $SO_3$ in the gas state from the flue gas 12. As a result, the amount of the $SO_3$ mist 50 introduced to the $CO_2$ recovery equipment 17 is decreased.

As the dissolved salt 24, for example, there are NaCl, NaOH, $Na_2SO_4$, $Na_2CO_3$, KCl, KOH, $K_2SO_4$, $K_2CO_3$, $KHCO_3$, $MgCl_2$, $MgSO_4$, $CaCl_2$, and the like.

Here, when $Na_2SO_4$ is used as the dissolved salt, a reaction between dissolved salt particles ($Na_2SO_4$) and $SO_3$ as in Expression (1) below proceeds. As a result, $NaHSO_4.H_2O$ (solid) is generated.

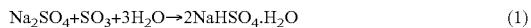

$$Na_2SO_4 + SO_3 + 3H_2O \rightarrow 2NaHSO_4.H_2O \quad (1)$$

Both $Na_2SO_4$ and $NaHSO_4.H_2O$ are soluble and thus are dissolved in the $SO_x$ removal equipment 15 on the downstream side. Therefore, for example, compared to a case where ammonia is injected, a solid matter treatment including ammonia of the dry type electric dust collector 14 is unnecessary. In this embodiment, as a result of reducing $SO_3$ in the gas state which is the mist generation material from the flue gas 12, a decrease in the amount of the $SO_3$ mist 50 introduced to the $CO_2$ recovery equipment 17 is achieved. Therefore, the generation of white smoke of the purified gas 18 discharged from the absorber 17A, which is caused by the mist, is suppressed, and an entraining of the absorption liquid 41 is suppressed. As a result, an air pollution control system in which there is no loss of the absorption liquid 41 may be provided.

In addition, the flue gas 12 from which particulates are reduced in the electric dust collector 14 is subjected to a reduction in sulfur oxides from the flue gas 12 in the $SO_x$ removal equipment 15, the reduced sulfur oxides are supplied with limestone ($CaCO_3$) 15a and oxidation air 15b to become gypsum 15c through a limestone-gypsum method, and desulfurized waste water 15d is additionally treated. Note that, in the figures, reference numerals 17a, 17b, 17c, 17d, 17e, and 17f denote a reboiler, saturated water vapor, condensed water, a separation drum, recovered $CO_2$, and a heat exchanger, respectively.

The flue gas 12 desulfurized by the $SO_x$ removal equipment 15 is cooled by the cooler 16 to cause the flue gas temperature to be 50° C. or less, and is introduced to the $CO_2$ recovery equipment 17 including the absorber 17A and the regenerator 17B. Here, $CO_2$ in the flue gas 12 is reduced by, for example, the amine-based absorption liquid 41. At this time, in this embodiment, as a result of reducing $SO_3$ in the gas state which is the mist generation material from the flue gas 12, a decrease in the amount of the $SO_3$ mist introduced to the $CO_2$ recovery equipment 17 is achieved. Therefore, the generation of white smoke of the purified gas 18 discharged from the absorber 17A, which is caused by the mist, is suppressed. As a result, an air pollution control system in which the loss of the absorption liquid 41 is significantly decreased may be provided.

Here, in this embodiment, the amine-based absorption liquid is exemplified as the absorption liquid. However, the absorption liquid of the present invention is not limited to the amine-based absorption liquid. As the absorption liquid, besides the amine-based absorption liquid, for example, an amino acid-based absorption liquid, an ionic liquid absorption liquid, a hot potassium carbonate absorption liquid made of potassium carbonate and amines, and the like may be exemplified.

FIG. 5 is a schematic diagram of an air pollution control system of a modified example of the first embodiment. In the cooler 16 illustrated in FIG. 4, the flue gas 12 is cooled. However, as illustrated in FIG. 5, an air pollution control system 10B is provided with a finishing $SO_x$ removal unit 16b at the lower portion of the cooler 16 and supplies the limestone ($CaCO_3$) 15a and the oxidation air 15b to form the gypsum 15c through the limestone-gypsum method. Accordingly, sulfur oxides that remain in the flue gas 12 from the $SO_x$ removal equipment 15 is reduced, and thus the $SO_x$ removal efficiency is further enhanced. Note that, a strong alkaline agent such as sodium hydroxide (NaOH) may be added along with the limestone.

In this embodiment, in the finishing $SO_x$ removal unit 16b, a liquid column type is used as a method of supplying a $SO_x$ removal absorption liquid. However, the present invention is not limited thereto, and any of sprinkling type, jet type, and filling type may also be used.

Here, as the $SO_x$ removal absorption liquid used in the finishing $SO_x$ removal unit 16b, besides the limestone ($CaCO_3$), a strong alkaline agent such as NaOH, $Na_2CO_3$, $NaHCO_3$, $Ca(OH)_2$, or $Mg(OH)_2$ may be exemplified. By using the strong alkaline agent, further enhancement of the $SO_x$ removal performance may be achieved, and this is particularly effective in a case where the flue gas 12 having a high sulfur oxide concentration is introduced, thereby decreasing the concentration of sulfur oxides in the flue gas 12 introduced to the $CO_2$ recovery equipment 17 to an extremely low concentration. The $SO_x$ removal performance is increased compared to the limestone-gypsum method. Therefore, even in a case where the concentration of sulfur oxides in the introduced flue gas 12 is high, favorable $SO_x$ removal performance is exhibited, which is preferable.

As described above with the embodiment, according to the present invention, the dissolved salt spraying equipment 23 is provided as the mist generation material reduction equipment 20. Therefore, an air pollution control system in which the absorption liquid 41 is not entrained when the flue gas 12 from which $CO_2$ is reduced is discharged to the outside may be provided.

REFERENCE SIGNS LIST 10, 10A, 10B AIR POLLUTION CONTROL SYSTEM
11 BOILER
12 FLUE GAS
13 NO REMOVAL EQUIPMENT
14 ELECTRIC DUST COLLECTOR
15 $SO_x$ REMOVAL EQUIPMENT
16 COOLER
16a COOLING UNIT
16b FINISHING $SO_x$ REMOVAL UNIT
17 $CO_2$ RECOVERY EQUIPMENT
17A ABSORBER
17B REGENERATOR
18 PURIFIED GAS
20 MIST GENERATION MATERIAL REDUCTION EQUIPMENT
23 DISSOLVED SALT SPRAYING EQUIPMENT

The invention claimed is:

1. An air pollution control system comprising:
an electric dust collector for reducing particulates from flue gas from a boiler;
$SO_x$ removal equipment for reducing sulfur oxides from the flue gas after the reduction in the particulates;
a cooler which is provided on a downstream side of the $SO_x$ removal equipment, for reducing the sulfur oxides that remain in the flue gas and for decreasing a gas temperature;
$CO_2$ recovery equipment which includes:
an absorber for bringing $CO_2$ in the flue gas into contact with a $CO_2$ absorption liquid so as to be reduced, and
a regenerator for causing the $CO_2$ absorption liquid to emit $CO_2$ so as to recover $CO_2$ and regenerate the $CO_2$ absorption liquid; and
dissolved salt spraying equipment for reducing a mist generation material which is a generation source of mist that is generated in the absorber of the $CO_2$ recovery equipment before introducing the flue gas to the $CO_2$ recovery equipment.

2. The air pollution control system according to claim 1, further comprising $NO_x$ removal equipment for reducing nitrogen oxides from the flue gas.

3. An air pollution control system comprising:
$SO_x$ removal equipment for reducing sulfur oxides from flue gas from a boiler;
a cooler which is provided on a downstream side of the $SO_x$ removal equipment, for reducing the sulfur oxides that remain in the flue gas and for decreasing a gas temperature;
$CO_2$ recovery equipment which includes:
an absorber for bringing $CO_2$ in the flue gas into contact with a $CO_2$ absorption liquid so as to be reduced, and
a regenerator for causing the $CO_2$ absorption liquid to emit $CO_2$ so as to recover $CO_2$ and regenerate the $CO_2$ absorption liquid; and
dissolved salt spraying equipment for reducing a mist generation material which is a generation source of mist that is generated in the absorber of the $CO_2$ recovery equipment before introducing the flue gas to the $CO_2$ recovery equipment.

4. The air pollution control system according to claim 3, further comprising:
$NO_x$ removal equipment for reducing nitrogen oxides from the flue gas; and
a dry type electric dust collector for reducing particulates.

5. An air pollution control method comprising:
on an upstream side of $CO_2$ recovery equipment which brings $CO_2$ in flue gas into contact with a $CO_2$ absorption liquid so as to be absorbed and reduced,
on a downstream side where particulates are reduced from the flue gas and on an upstream side of $SO_x$ removal equipment which reduces sulfur oxides, spraying a dissolved salt into the flue gas to cause a mist generation material to be adsorbed and fixed onto the dissolved salt so as to be reduced; and
decreasing an amount of the mist generation material in the flue gas introduced to the $CO_2$ recovery equipment to a predetermined amount or less.

* * * * *